United States Patent [19]

Giebeler et al.

[11] Patent Number: 4,970,201

[45] Date of Patent: Nov. 13, 1990

[54] PRESERVATIVES FOR CELLULOSE CONTAINING PRODUCTS

[75] Inventors: Eberhard Giebeler, Schriesheim; Detlef Wehle, Kastl/Obb.; Helmut Härtner, Weinheim; Franz König, Frankfurt am Main; Helmut Berenbold, Wiesbaden, all of Fed. Rep. of Germany

[73] Assignee: Rutgerswerke AG, Fed. Rep. of Germany

[21] Appl. No.: 391,469

[22] Filed: Aug. 9, 1989

[30] Foreign Application Priority Data

Aug. 16, 1988 [DE] Fed. Rep. of Germany ....... 3827721

[51] Int. Cl.$^5$ ...................... A01N 55/08; A01N 33/12
[52] U.S. Cl. ........................................ 514/64; 514/642; 514/947
[58] Field of Search ............ 514/642, 947, 64; 558/291

[56] References Cited

U.S. PATENT DOCUMENTS 4,376,736  3/1983  Stanley ............................. 558/291
4,824,484  4/1989  Metzner et al. ..................... 514/642

FOREIGN PATENT DOCUMENTS 0049017  9/1981  European Pat. Off. .

OTHER PUBLICATIONS

Chemical Abstracts, vol. 101 p. 192645D (1984).

Primary Examiner—Douglas W. Robinson
Assistant Examiner—Kevin E. Weddington
Attorney, Agent, or Firm—Bierman and Muserlian

[57] ABSTRACT

A biocidal preservative for cellulose-containing products containing a biocidally effective amount of a polymeric quaternary ammonium borate obtained by simultaneous reaction of (A) at least one member of the group consisting of boric acid and salts and esters thereof and (B) an amine of the formula

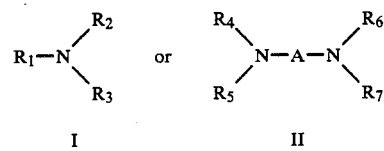

and (C) ethylene oxide or propylene oxide wherein $R_1$ is alkyl or alkenyl of 8 to 22 carbon atoms and $R_2$ is hydrogen, alkyl of 1 to 22 carbon atoms or $-CH_2CH_2NH_2$ or $R_1$ is alkyl of 1 to 4 carbon atoms and $R_2$ is $-(CH_2CH_2O)_x-H$ or $-(CH_2CH_2CH_2O)_x-H$, $R_3$ is selected from the group consisting of hydrogen, $-(CH_2CH_2O)_x-H$, $(CH_2CH_2CH_2O)_x-H$ and $-CH_2CH_2CH_2NH_2$, $R_4$ and $R_6$ are individually selected from the group consisting of alkyl of 1 to 4 carbon atoms, $-(CH_2CH_2O)_x-H$ and $-(CH_2CH_2O)_x-H$, and $R_5$ and $R_7$ are individually $-(CH_2CH_2O)_x-H$ and $-(CH_2CH_2CH_2O)_x-H$, A is selected from the group consisting of $-(CH_2)_n$, $-(CH_2CH_2-O-CH_2CH_2)_n-$ and $-(CH_2CH_2-NH-CH_2CH_2)_n-$ x is an integer from 1 to 55 and n is an integer of 1 to 20, the molar ratio of A:B:C being 1:2 to 20:0.6 to 1.5.

7 Claims, No Drawings

PRESERVATIVES FOR CELLULOSE CONTAINING PRODUCTS

STATE OF THE ART

The use of quaternary ammonium compounds in water-soluble and in solvent-containing wood preservatives is known (Seifen-Ole-Fette-Wachse 109, Volume No. 20, 1983, Pages 603 to 606). It is also known, to increase the positive protective action of the quaternary ammonium compounds by combination with other organic or inorganic agents (e.g. DE-A Nos. 3,502,939, 3,621,360 or 3,718,012).

All these agents have two drawbacks: upon application onto wood through impregnation or spraying, the high substantivity of the quaternary ammonium compounds results in a very low depth penetration which does not exceed 1 to 2 mm even with various solvents and thus does not meet the requirements of the Institute for Structural Engineering which demands a depth of penetration of at least 3 mm. Secondly, the quaternary ammonium compounds are very unevenly spread over the wood surface and this so-called spotting effect leads to a partial susceptibility of the thus-protected wood to microorganisms.

OBJECTS OF THE INVENTION

It is an object of the invention to provide preservative agents for preserving wood and wood products which have the positive biocidal properties of the quaternary ammonium compounds but are also characterized by a good distribution over the wood surface and a good depth of penetration into the treated wood.

It is another object of the invention to provide a novel method of preserving cellulose containing products by applying with a uniform and increased depth of penetration a preservative.

These and other objects and advantages of the invention will become obvious from the following detailed description.

THE INVENTION

The novel preservatives of the invention for cellulose-containing products contain a biocidally effective amount of a polymeric quaternary ammonium borate obtained by simultaneous reaction of (A) at least one member of the group consisting of boric acid and salts and esters thereof and (B) an amine of the formula

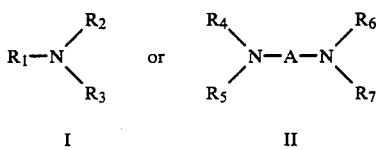

and (C) ethylene oxide or propylene oxide wherein $R_1$ is alkyl or alkenyl of 8 to 22 carbon atoms and $R_2$ is hydrogen, alkyl of 1 to 22 carbon atoms or $-CH_2CH_2CH_2NH_2$ or $R_1$ is alkyl of 1 to 4 carbon atoms and $R_2$ is $-(CH_2CH_2O)_x-H$ or $-(CH_2CH_2CH_2O)_x-H$, $R_3$ is selected from the group consisting of hydrogen, $-(CH_2CH_2O)_x-H$, $(CH_2CH_2CH_2O)_x-H$ and $-CH_2CH_2CH_2NH_2$, $R_4$ and $R_6$ are individually selected from the group consisting of alkyl of 1 to 4 carbon atoms, $-(CH_2CH_2O)_x-H$ and $-(CH_2CH_2CH_2O)_x-H$, $R_5$ and $R_7$ are individually $-(CH_2CH_2O)_x-H$ and $-(CH_2CH_2CH_2O)_x-H$, A is selected from the group consisting of $-(CH_2)_n$, $-(CH_2CH_2-O-CH_2CH_2)_n$ and $-(CH_2CH_2-NH-CH_2CH_2)_n$ x is an integer from 1 to 55 and n is an integer of 1 to 20, the molar ratio of A:B:C being 1:2 to 20:0.6 to 1.5.

It has been found that the solutions or microemulsions of polymeric quaternary ammonium borates in water or in organic solvents are suitable as preservatives not only for wood but also for other cellulose-containing products such as textile webs, tarpaulins or jute bags and they meet the raised demands in a best possible manner. Apart from an expected positive biocidal action, polymeric quaternary ammonium borate evenly spreads over the wood and deeply penetrates the wood. This is especially surprising as the salty quaternary ammonium borate which is made through reaction of a quaternary ammonium compound with boric acid or a borate is essentially unsuitable as wood preservatives.

The combination of quaternary ammonium compounds with boric salts results in salting-out effects which render it impossible to make respective concentrates. In a manner typical for quaternary ammonium compounds, the ammonium salt spreads from the dilute aqueous solution unevenly over the wood surface which is to be treated therewith without penetrating the wood. Moreover, the boric salt can be washed out. Polymeric quaternary ammonium borates of the invention and made through reaction of ethylene oxide or propylene oxide with secondary amines and boric acid are in contrast thereto miscible with water and certain organic solvents in all proportions, and these solutions or microemulsions show in connection with wood the effects as set forth above. Surprisingly, the biocidally effective boron is fixed in the wood.

Examples of amines of formula I are those wherein $R_1$ is alkyl of 8 to 22 carbon atoms, $R_2$ is alkyl of 8 to 22 carbon atoms or alkyl of 1 to 4 carbon atom and $R_3$ is hydrogen or $-(CH_2CH_2O)_x-H$ or $-(CH_2CH_2CH_2O)_x-H$, those wherein $R_1$ is alkyl of 8 to 22 carbon atoms and $R_2$ and $R_3$ are hydrogen, those wherein $R_1$ is alkyl of 1 to 4 carbon atoms or 8 to 22 carbon atoms and $R_2$ and $R_3$ are $-(CH_2CH_2O)_x 13$ H or $-(CH_2CH_2CH_2O)_x-H$ when x is an integer of 2 to 20, those wherein $R_1$ is alkyl of 8 to 22 carbon atoms, $R_2$ is hydrogen or $-CH_2CH_2CH_2NH_2$ and $R_3$ is $-CH_2CH_2CH_2NH_2$. Examples of suitable amines of formula II are those wherein A, $R_4$, $R_5$, $R_6$ and $R_7$ have the above definitions and the sum of the ethylene oxide groups is 4 to 30.

With respect to the alkylene oxide groups, $-(CH_2CH_2O)_x-H$ is preferred over $-(CH_2CH_2CH_2O)_x-H$. The alkylene oxide groups may be a mixture of ethylene oxide and propylene oxide groups.

The reaction of the amines with boric acid and the alkylene oxide is effected so that the alkylene oxide is added in controlled doses to the respective amine and the boric acid which are already present in an autoclave. The reaction temperature is usually 60° to 130° C., preferably 60° to 125° C., more preferably 60° to 100° C. and the reaction pressure is 50 to 600 kPa. The dosage of the alkylene oxide under these reaction conditions is effected over a period of 1 to 5 hours. During the postreaction, the mixture is maintained at a temperature of 70° to 120° C., preferably 70° to 100° C., for 3 to 12 hours at the indicated pressure.

Instead of boric acid, water-soluble salts such as alkali metal salts, i.e. sodium borate, or esters thereof such trialkyl borates, i.e. trimethyl borate, may be used. The by-products of the reaction are water and polyglycols.

The resulting polymeric quaternary ammonium compounds contain essentially as structural characteristics groups of the formula

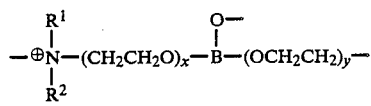

or of the formula

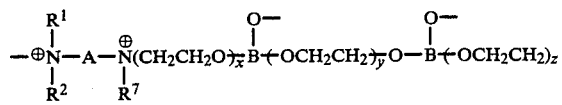

when the reaction is effected with ethylene oxide. The presence of polymeric or oligomeric quaternary ammonium borates is based on the fact that during the reaction of amines of formulae I and II with boric acid and alkylene oxide, water is formed as shown by the examples.

The polymeric quaternary ammonium borates may be diluted with water and they are readily soluble in glycols, glycol ethers, ethers, lower alkanols or in mixtures of these solvents with chloroform or methylene chloride. The viscosity is between 1 and 100 Pas and in some cases may be as high as 300 Pas. The viscosity of the polymeric quaternary ammonium borates is dependent on the reaction temperature, with higher reaction temperatures leading to lower viscosities.

After termination of the reaction, the obtained raw solution of the polymeric quaternary ammonium borates may be used as a concentrate directly for the indicated purpose without further purification and treatment, or may be processed with other, additional biocidal agents and possibly with pigments, dyes or other known additives to form a concentrate with a broader range of effectiveness. Due to their production, these raw solutions usually contain approximately 6 to 12% water and approximately 8 to 12% glycols. Although removal of these by-products, especially of the glycols, is possible, it is not required.

Examples of additional biocidal agents are organic insecticides such as e.g. pyrethroids, organic fungicides such as e.g. isothiazolines or inorganic protective salts such as e.g. copper salts, zinc salts or boric salts with the inorganic salts finding use only in primarily aqueous preparations and the organic agents finding use in aqueous preparations as well as in primarily water-free preparations.

The polymeric quaternary ammonium borates of the invention are dilutable with water in any desired manner whereby stable microemulsions are formed and particle sizes of the emulsified polymeric quaternary ammonium borates are obtained which are smaller than the capillaries of the wood. By addition of 5 to 25 weight-% of polyols, especially polypropylene glycol, clear solutions are obtained as primarily aqueous preparations which show improved depth of penetration (3-4 mm in pinewood) during immersion and impregnation.

The microemulsions and the primarily aqueous preparations which contain a content of 3 to 7 weight-% of polymeric quaternary ammonium borates relative to the overall mixture are especially suitable for temporary blueing protection and are applied by known immersion methods, spraying methods or coating methods. In view of the improved depth of penetration, the primarily aqueous preparations are further suitable for preventive wood preservation in danger classes with and without earth contact, for the latter application especially when applying the solution to the wood by a boiler pressure process.

The primarily aqueous preparations of the preservatives of the invention are obtained by dissolving the concentrates in a solvent or preferably in a solvent mixture. The preferred solvent mixture contains a high boiling polyol component such as e.g. polyethylene glycol or di- or tripropylene glycol methyl ether and a fraction of one or more low-boiling solvents such as e.g. hexane, toluol, cyclohexane, chloroalkanes, ketones or lower alkanols. High-boiling and low-boiling solvent components are used in a ratio of 1:4 to 1:10.

The final preservatives have a content of 3 to 5 weight-% of polymeric quaternary ammonium borate as well as other optional insecticides and fungicides in the usual concentrations. They are suitable as coating agents or for use in dipping methods and boiler pressure methods. Due to the considerable depth of penetration of the polymeric quaternary ammonium compounds which are dissolved in the described organic solvents (more than 5 mm according to DIN No. 52,162), the agents of the invention provide a good wood preservation, especially against blue molds and Basidiomycetes.

In the following examples there are described several preferred embodiments to illustrate the invention. However, it is to be understood that the invention is not intended to be limited to the specific embodiments.

EXAMPLE 1

194.4 g (0.80 mol) of a mixture of 9.6% (n/n) of octyl amine, 89% (n/n) of dioctyl amine and 1.4% (n/n) of trioctyl amine (amine value: 230.9) and 49.9 g (0.80 mol) of water-free boric acid were placed in a one liter glass autoclave and heated with stirring to 80° C. 158 ml (3.20 mol) of liquid ethylene oxide was then added at controlled doses at an internal temperature of 80° to 100° C. over a period of 2.5 hours so that the internal pressure did not exceed a value of 460 kPa. After termination of the addition, the mixture was allowed to post-react for 6 hours and after this period, the pressure dropped to 40 kPa.

The reaction product which was liquid and homogenous at 25° C. was characterized by the following analytical values: viscosity (Haake RV 12, 25° C., $D=21$ $s^{-1}$): 39 Pa.s, water (K. Fischer): 10% (m/m), ethylene glycol: 7.4% (m/m), diethylene glycol: 3.3% (m/m), triethylene glycol: 1.7% (m/m), pH-value: 9.8. From an ethylene oxide balance, a static value of 3 moles of bound ethylene oxide per nitrogen equivalent was calculated.

EXAMPLE 2

194.4 g (0.80 mol) of a mixture of 9.6% (n/n) of octyl amine, 89% (n/n) of dioctyl amine and 1.4% (n/n) of trioctyl amine (amine value: 230.9) and 49.9 g (0.80 mol) of water-free boric acid were placed in a one liter glass autoclave and heated with stirring to 80° C. 185.8 g (3.20 mol) of liquid propylene oxide was then added at controlled doses at an internal temperature of 80° to 86° C. over a period of 2 hours, with the pressure being 140 to 280 kPa. After termination of the addition, the mixture was allowed to post-react for 12 hours at 80° to 84°

C. A liquid, colorless homogenous reaction product was obtained which was characterized by the following analytical values: viscosity: 117 mPa.s, water: 9.0%, propylene glycol: 2.1%, dipropylene glycol: 3.2%, tripropylene glycol: 1.0%. From a propylene oxide balance, a static value of 3 moles of bound propylene oxide per nitrogen equivalent was calculated.

EXAMPLE 3

253.8 g (0.5 mol) of dipalmity/distearylamine (content of primary amines 5.4% (n/n), secondary amines: 91.0% (n/n), tertiary amines: 3.6% (n/n); amine value: 110.5) and 30.9 g (0.5 mol) of water-free boric acid were placed in a one liter glass autoclave and heated with stirring to 80° C. Then, 197.5 ml (176.2 g, 4.0 mol) of liquid ethylene oxide were added at controlled doses at a temperature of 82° to 88° C. over a period of 4.5 hours at a pressure reaching a maximum of 440 kPa. After termination of the addition, the mixture was allowed to post-react for 16 hours at 85° to 95° C. and then the reaction was discontinued. A light yellow, homogenous, liquid reaction mixture was obtained which was characterized by the following analytical values: viscosity 7.0 Pa.s, water: 3.1%, ethylene glycol: 5.1%, diethylene glycol: 4.5%, triethylene glycol: 6.5%, pH-value: 9.6. From an ethylene oxide balance, a static value of 4.80 moles of chemically bound ethylene oxide per nitrogen equivalent was calculated.

EXAMPLE 4

136.5 g (0.40 mol) of tallow containing alkyl hydroxyethylmethylamine (amine value 149.4) and 24.7 g (0.40 mol) of water-free boric acid were placed in a one liter glass autoclave and heated to 80° C. Then, 79 ml (70.5 g, 1.60 mol) of liquid ethylene oxide were added at controlled doses over a period of 1.5 hours, with the internal temperature increasing to 88° to 92° C. (exothermic effect). During the addition, the pressure was a maximal 280 kPa. After termination of the addition, the mixture was allowed to post-react for 7 hours at 80° to 84° C. and then the reaction was discontinued. A dark yellow, liquid, homogenous reaction mixture was obtained which was characterized by the following analytical values: viscosity 1.4 Pa.s, water: 7.5%, ethylene glycol: 7.5%, diethylene glycol: 1.1%, triethylene glycol: 0.9%, pH-value: 9.7. From an ethylene oxide balance, a static value of 3.0 mol of chemically bound ethylene oxide per nitrogen equivalent was calculated.

EXAMPLE 5

136.5 g (0.40 mol) of tallow containing alkyl hydroxyethylmethylamine (amine value 149.4) and 24.7 g (0.40 mol) of water-free boric acid were placed in a one liter glass autoclave and heated to 80° C. Then, 104.3 ml (92.9 g, 1.60 mol) of liquid propylene oxide were added at controlled doses over a period of 1.5 hours, with the internal temperature increasing to 88° C. During the addition, the pressure was a maximal 280 kPa. After termination of the addition, the mixture was allowed to post-react for 16 hours at 80° to 86° C. and then the reaction was discontinued. A light yellow, homogenous, viscous reaction mixture was obtained which was characterized by the following analytical values: viscosity 20.6 Pa.s, water: 6.1%, propylene glycol: 4.0%, dipropylene glycol: 4.0%, tripropylene glycol: 0.5%, pH-value: 9.4. From a propylene oxide balance, a static value of 3.2 mol of chemically bound propylene oxide per nitrogen equivalent was calculated.

EXAMPLE 6

105.3 g (0.80 mol) of octyl amine (amine value 428) and 49.4 g (0.80 mol) of water-free boric acid were placed in a one liter glass autoclave and heated to 80° C. Then, 316 ml (218.9 g, 6.40 mol) of liquid ethylene oxide were added at controlled doses over a period of 3.5 hours at an internal temperature of 80° to 103° C. whereby a pressure of maximal 560 kPa was reached. After termination of the addition, the mixture was allowed to post-react for 5 hours at 80° C. and then the reaction was discontinued. A dark yellow, highly viscous, homogenous reaction mixture was obtained which was characterized by the following analytical values: viscosity 64.2 Pa.s, water: 9.0%, ethylene glycol: 7.3%, diethylene glycol: 3.8% triethylene glycol: 3.6%, pH-value: 10.1. From an ethylene oxide balance, a static value of 3.15 mol of bound ethylene oxide per nitrogen equivalent was calculated.

EXAMPLE 7

A mixture of 95.80 g (0.80 mol) of N-methyl-diethanolamine and 49.40 g (0.80 mol) of boric acid in 51 g of isopropanol was placed in a one liter glass autoclave and heated to 80° C. Then, 158 ml (141 g, 3.20 mol) of liquid ethylene oxide were added at controlled doses over a period of 4.5 hours at a temperature of 80° to 93° C. and at a pressure of 80 to 460 kPa. After termination of the addition, the mixture was allowed to post-react for 5 hours at 84° to 85° C. and then the reaction was discontinued. A dark, highly viscous, homogenous reaction mixture was obtained which was characterized by the following analytical values: viscosity 71.6 Pa.s, water: 16.4% ethylene glycol: 6.3%, diethylene glycol: 1.0%, triethylene glycol: 0.7%, pH-value: 10.1. From an ethylene oxide balance, a static value of 3.55 mol of chemically bound ethylene oxide per nitrogen equivalent was calculated.

EXAMPLE 8

114.2 g (0.30 mol) of N-containing sebaceous alkyl -N,N-bis(3-aminopropyl)amine (equivalent amine value: 432) and 55.8 g (0.90 mol) of boric acid in 30.7 g of 2-propanol were placed in a one liter glass autoclave and heated to 80° C. Then, 118.5 ml (105.7 g, 2.40 mol) of ethylene oxide were added at controlled doses over a period of 2 hours at an internal temperature of 80° to 90° C. and at a pressure of 80 to 320 kPa. After termination of the addition, 30.7 g of 2-propanol were again added to lower the extremely high viscosity, and then the mixture was allowed to post-react for 10 hours at 80° to 85° C. A yellow reaction mixture was obtained which was characterized by the following analytical values: viscosity 43.9 Pa.s, water: 6.0%, ethylene glycol: 9.4%, diethylene glycol: 8.7%, triethylene glycol: 2.9%, pH-value: 9.5. From an ethylene oxide balance, a static value of 2.7 mol of chemically bound ethylene oxide per nitrogen equivalent was calculated.

EXAMPLE 9

A mixture of 231.2 g (0.80 mol) of a mixture of 8.7% (n/n) of decyl amine, 90.7% (n/n) of didecyl amine and 0.6% (n/n) of tridecyl amine (amine value 194.1) and 49.5 (0.80 mol) of boric acid was placed in a one liter glass autoclave and heated to 105° C. Then, 158 ml (141 g, 3.20 mol) of ethylene oxide were added at controlled doses over a period of 2.5 hours at an internal temperature of 110° to 125° C. with the pressure reaching 120 to 480 kPa. After termination of the addition, the mixture was allowed to post-react for 12 hours at 120° C. and then the reaction was discontinued. A light yellow, homogenous reaction mixture was obtained which was characterized by the following analytical values: viscosity: 3.1 Pa.s, water: 7.3%, ethylene glycol: 7.2%, diethylene glycol: 10.9%, triethylene glycol: 4.6%, pH-value: 9.0. From an ethylene oxide balance, a static value of 1.8 mol of chemically bound ethylene oxide per nitrogen equivalent was calculated.

EXAMPLE 10

263.9 g (0.70 mol) of didecyl amine + 1.8 mol of ethylene oxide (purity 95%) and 43.3 g (0.70 mol) of water-free boric acid were placed in a one liter glass autoclave and heated with stirring to 80° C. Then, 138.2 ml (123.3 g, 2.80 mol) of liquid ethylene oxide were added at controlled doses over a period of 2.5 hours at an internal temperature of 74° to 90° C. During the addition, the pressure was 100 to 420 kPa. After termination of the addition, the mixture was allowed to post-react for 8 hours at 84° to 86° C. (pressure at end of reaction: 20 kPa) and then the reaction was discontinued. The yellow, homogenous, viscous reaction mixture was characterized by the following analytical values: viscosity 29.7 Pa.s, water: 4.9%, ethylene glycol: 6.5%, diethylene glycol: 4.1%, triethylene glycol: 3.5%, pH-value: 9.9. From an ethylene oxide balance, a static value of 2.5 mol of chemically bound ethylene oxide per nitrogen equivalent was calculated.

EXAMPLE 11

1734 g (6.0 mol) of a mixture of 8.7% (n/n) of decyl amine, 90.7% (n/n) of didecyl amine and 0.6% (n/n) of tridecyl amine (amine value 194) and 371 g (6.0 mol) of water-free boric acid were placed in a one liter glass autoclave and heated with stirring to 75° to 80° C. Then, 1185 ml (1057 g, 24 mol) of liquid ethylene oxide were added at controlled doses over a period of 4.5 hours at an internal temperature of 80° to 88° C. so that the internal pressure did not exceed a value of 500 kPa. After termination of the addition, the mixture was allowed to post-react for 10 hours at a temperature of 75° to 80° C. Within this period, the pressure dropped to 60 kPa. In this manner, a reaction product was obtained which was highly viscous, light yellow and homogenous at a temperature of 25° C. and was characterized by the following analytical values: viscosity 96 Pa.s, water: 6.9%, ethylene glycol: 6.7%, diethylene glycol: 2.8%, triethylene glycol: 1.9%, pH-value: 10.1. From an ethylene oxide balance, a static value of 3 mol of chemically bound ethylene oxide per nitrogen equivalent was calculated.

EXAMPLE 12

188.5 g (0.5 mol) of didecyl amine and 1.8 mol of ethylene oxide (purity 95%, amine value: 148.7) and 30.9 g (0.5 mol) of water-free boric acid were placed in a one liter glass autoclave and heated to 75° C. Then, 197.5 ml (176.2 g, 4 mol) of ethylene oxide were added at controlled doses over a period of 3 hours at a temperature of 75° to 86° C. whereby a pressure of maximal 560 kPa was reached. After termination of the addition, the mixture was allowed to post-react for 7.5 hours at 84° to 86° C. and then the reaction was discontinued. The yellow, viscous, homogenous reaction mixture was characterized by the following analytical values: viscosity: 8.0 Pa's, water: 3.2%, ethylene glycol: 5.3%, diethylene glycol: 4.2%, triethylene glycol: 6.2%, pH-value: 10.0. From an ethylene oxide balance, a static value of 5.9 mol of chemically bound ethylene oxide per nitrogen equivalent was calculated.

EXAMPLE 13

A mixture of 206.5 g (0.70 mol) of didecyl amine (amine value: 190.2) and 43.3 g (0.70 mol) of boric acid in 42.4 g of water was placed in a one liter glass autoclave and heated to 78° C. Then, 138.2 ml (123.3 g, 2.80 mol) of liquid ethylene oxide were added at controlled doses over a period of 2.5 hours at a temperature of 78° to 88° C. and a pressure of 80-340 kPa. After termination of the addition, the mixture was allowed to post-react for 7 hours at 80° C. and then the reaction was discontinued. The light yellow, viscous, homogenous reaction mixture was characterized by the following analytical values: viscosity 3.8 Pa.s, water: 18%, ethylene glycol: 5.4%, diethylene glycol: 2.3%, triethylene glycol: 1.4%, pH-value: 10.0. From an ethylene oxide balance, a static value of 3.1 mol chemically bound ethylene oxide per nitrogen equivalent was calculated.

EXAMPLE 14

A solution of 75 weight-% of technical polymeric quaternary ammonium borate (PQAB) of Example 1, 15 weight-% of polypropylene glycol and 10 weight-% of isopropanol was diluted with water into various samples with a content of 3, 4 and 5 weight-% of PQAB. Samples of pinewood were treated by immersion in the respective samples for one minute. The depth of penetration of PQAB, determined in accordance with DIN 52162, was 3 mm.

The effectiveness of the agent as blueing protectant was tested in a field experiment over three months. The results showed that already the sample with 3% PQAB corresponded to a reference sample with 2.5% sodium pentachlorophenolate and showed almost no fungal attack while the untreated sample was considerably affected by blue molds and mold fungi.

EXAMPLE 15

With a sample of 5 weight-% of PQAB of Example 1, 20 weight-% of dipolypropylene glycol monoethylether, 1.5 weight-% permethrin and 73.5 weight-% of naphtha as the solvent, samples of pinewood were treated by immersion for one minute. The depth of penetration of PQAB, determined according to DIN 52162, was 5.3 mm. The effectiveness as a preventive wood preservative was tested in a test chamber contaminated with fungus spores at 40° C. and 80% relative humidity. After a test period of over three months, no attack of the preserved wood samples was detected.

Various modifications of the compositions and method of the invention may be made without departing from the spirit or scope thereof and it should be understood that the invention is intended to be limited only as defined in the appended claims.

What is claimed is:

1. A method of preserving a cellulose containing product comprising treating the cellulose containing product with a biocidally effective amount of a biocidal preservative for cellulose-containing products containing a biocidally effective amount of a polymeric quaternary ammonium borate obtained by simultaneous reaction of (A) at least one member of the group consisting of boric acid and salts and esters thereof and (B) an amine of the formula

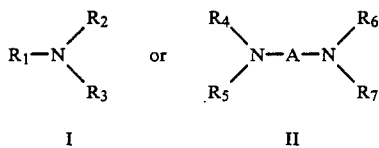

and (C) ethylene oxide or propylene oxide wherein $R_1$ is alkyl or alkenyl of 8 to 22 carbon atoms and $R_2$ is hydrogen, alkyl of 1 to 22 carbon atoms or —$CH_2CH_2CH_2NH_2$ or $R_1$ is alkyl of 1 to 4 carbon atoms and $R_2$ is —$(CH_2CH_2O)_x$—H or —$(CH_2CH_2CH_2O)_x$—H, $R_3$ is selected from the group consisting of —$(CH_2CH_2O)_x$—H, $(CH_2CH_2CH_2O)_x$—H and —$CH_2CH_2CH_2NH_2$, $R_4$ and $R_6$ are individually selected from the group consisting of alkyl of 1 to 4 carbon atoms, —$(CH_2CH_2O)_x$—H and —$(CH_2CH_2CH_2O)_x$—H, $R_5$ and $R_7$ are individually —$(CH_2CH_2O)_x$—H and —$(CH_2CH_2CH_2O)_x$—H, A is selected from the group consisting of —$(CH_2)_n$, —$(CH_2CH_2$—O—$CH_2CH_2)_n$ and —$(CH_2CH_2$—NH—$CH_2CH_2)n$, x is an integer from 1 to 55 and n is an integer of 1 to 20, the molar ratio of A:B:C being 1:2 to 20:0.6 to 1.5.

2. The method of claim 1 as an aqueous solution.

3. The method of claim 1 as a solution in an organic solvent.

4. The method of claim 1 wherein the organic solvent is at least one polyol.

5. The method of claim 1 wherein the organic solvent is polypropylene glycol.

6. The method of claim 1 wherein the glycol is monomethyl ether of dipropylene glycol.

7. The method of claim 1 wherein the cellulose containing product is wood.

* * * * *